United States Patent
Holtheide et al.

(10) Patent No.: US 11,279,191 B2
(45) Date of Patent: Mar. 22, 2022

(54) BALL JOINT

(71) Applicant: ZF Friedrichshafen AG, Friedrichshafen (DE)

(72) Inventors: Josef Holtheide, Neuenkirchen (DE); Florian Bäumer, Westerkappeln (DE); Felix Kallass, Osnabrück (DE)

(73) Assignee: ZF Friedrichshafen, Friedrichshafen (DE)

( * ) Notice: Subject to any disclaimer, the term of this patent is extended or adjusted under 35 U.S.C. 154(b) by 35 days.

(21) Appl. No.: 16/611,330

(22) PCT Filed: Apr. 18, 2018

(86) PCT No.: PCT/EP2018/059802
§ 371 (c)(1),
(2) Date: Nov. 6, 2019

(87) PCT Pub. No.: WO2018/210511
PCT Pub. Date: Nov. 22, 2018

(65) Prior Publication Data
US 2020/0139777 A1 May 7, 2020

(30) Foreign Application Priority Data
May 18, 2017 (DE) .................. 10 2017 208 410.3

(51) Int. Cl.
*B60G 7/00* (2006.01)
*B60G 17/019* (2006.01)
*F16C 11/06* (2006.01)

(52) U.S. Cl.
CPC .......... *B60G 7/005* (2013.01); *B60G 17/019* (2013.01); *F16C 11/0661* (2013.01);
(Continued)

(58) Field of Classification Search
CPC .. B60G 7/005; B60G 17/019; B60G 2204/11; B60G 2204/416; B60G 2401/17;
(Continued)

(56) References Cited

U.S. PATENT DOCUMENTS 6,050,727 A * 4/2000 Messmer ................ F16C 17/03
384/99
6,692,179 B2 2/2004 Bohne et al.
(Continued)

FOREIGN PATENT DOCUMENTS

CN 103527620 A 1/2014
DE 100 23 602 A1 11/2001
(Continued)

OTHER PUBLICATIONS

German Office Action Corresponding to 10 2017 208 410.3 dated Jan. 15, 2018.
(Continued)

*Primary Examiner* — Darlene P Condra
(74) *Attorney, Agent, or Firm* — Finch & Maloney, PLLC; Michael Bujold; Jay Franklin

(57) ABSTRACT

A ball joint (1), for a vehicle chassis, having a joint housing (3) and a joint body (4) having a spherical portion (5). The joint body (4) is held by the joint housing (3) at the spherical portion (5) of the joint body such that the joint body is mounted for articulation movement relative to the joint housing. A sensor assembly comprises a first sensor element (6) associated with the joint housing (4) and a second sensor element (7) associated with the joint body (4). The second sensor element interacts with the first sensor element (6) in order to sense the position of the joint body (4) relative to the joint housing (3). The ball joint is characterized in that the second sensor element (7) is arranged in the region of the spherical portion (5) of the joint body (4).

14 Claims, 4 Drawing Sheets

(52) U.S. Cl.
CPC ...... *F16C 11/0685* (2013.01); *B60G 2204/11* (2013.01); *B60G 2204/416* (2013.01); *B60G 2401/17* (2013.01); *B60G 2600/24* (2013.01); *F16C 2233/00* (2013.01)

(58) Field of Classification Search
CPC ........ B60G 2600/24; B60G 2204/1162; B60G 2400/05162; F16C 11/0661; F16C 11/0685; F16C 2233/00; F16C 41/00; F16C 11/0614
See application file for complete search history.

(56) References Cited

U.S. PATENT DOCUMENTS

| | | | |
|---|---|---|---|
| 7,695,212 B2 | 4/2010 | Spratte et al. | |
| 7,841,799 B2 * | 11/2010 | Spratte | F16C 11/0647 403/122 |
| 8,757,648 B1 * | 6/2014 | Winter | B60G 7/005 280/93.511 |
| 9,854,676 B2 * | 12/2017 | Erskine | H05K 3/34 |
| 2002/0114661 A1 * | 8/2002 | Bohne | F16C 11/0657 403/141 |
| 2006/0228167 A1 * | 10/2006 | Spratte | F16C 11/0642 403/122 |
| 2009/0016811 A1 * | 1/2009 | Spratte | F16C 17/24 403/163 |
| 2010/0021336 A1 | 1/2010 | Kruse | |
| 2011/0204881 A1 * | 8/2011 | Spratte | F16C 41/00 324/207.2 |
| 2015/0273966 A1 * | 10/2015 | Nilsson | F16C 11/0628 403/132 |
| 2016/0076586 A1 * | 3/2016 | Campbell | F16C 19/522 384/448 |
| 2018/0230899 A1 * | 8/2018 | Paulov | F02B 37/186 |
| 2019/0195278 A1 * | 6/2019 | Elfert | F16C 19/38 |

FOREIGN PATENT DOCUMENTS

| | | |
|---|---|---|
| DE | 101 10 738 C1 | 11/2002 |
| DE | 10 2004 039 781 A1 | 3/2006 |
| DE | 10 2006 060 994 A1 | 6/2008 |
| DE | 10 2008 041 050 A1 | 2/2010 |

OTHER PUBLICATIONS

International Search Report Corresponding to PCT/EP2018/059802 dated Jul. 27, 2018.
Written Opinion Corresponding to PCT/EP2018/059802 dated Jul. 27, 2018.

* cited by examiner

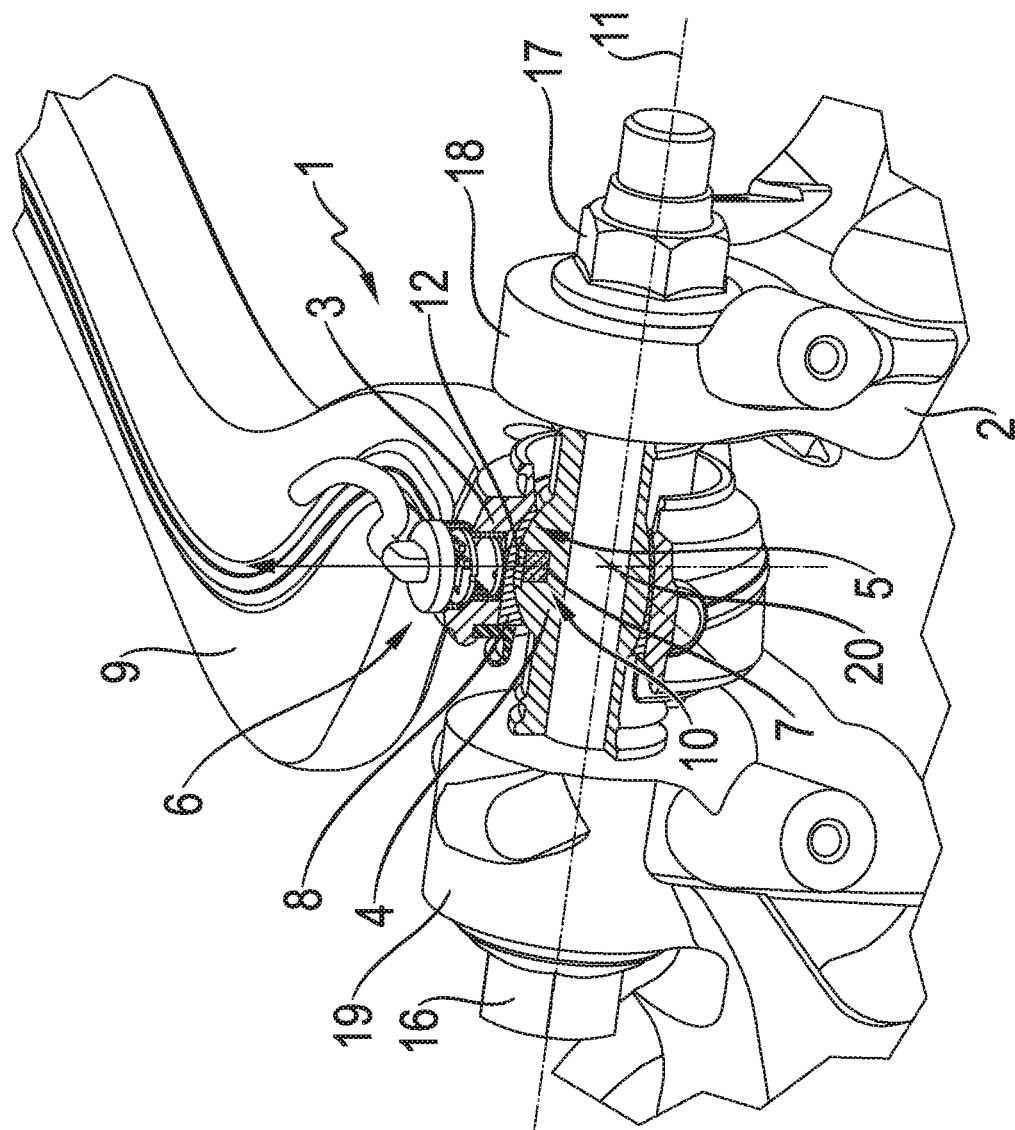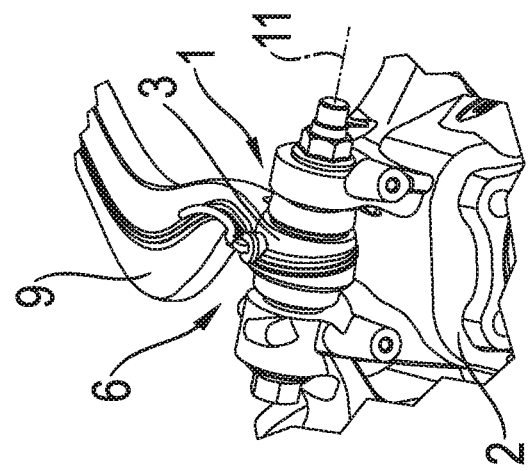
Fig. 1
Fig. 2

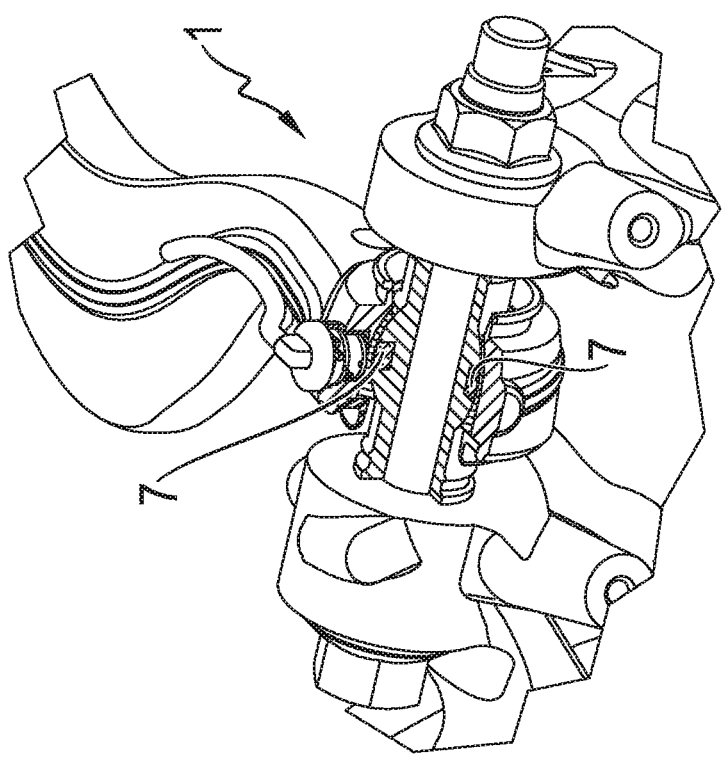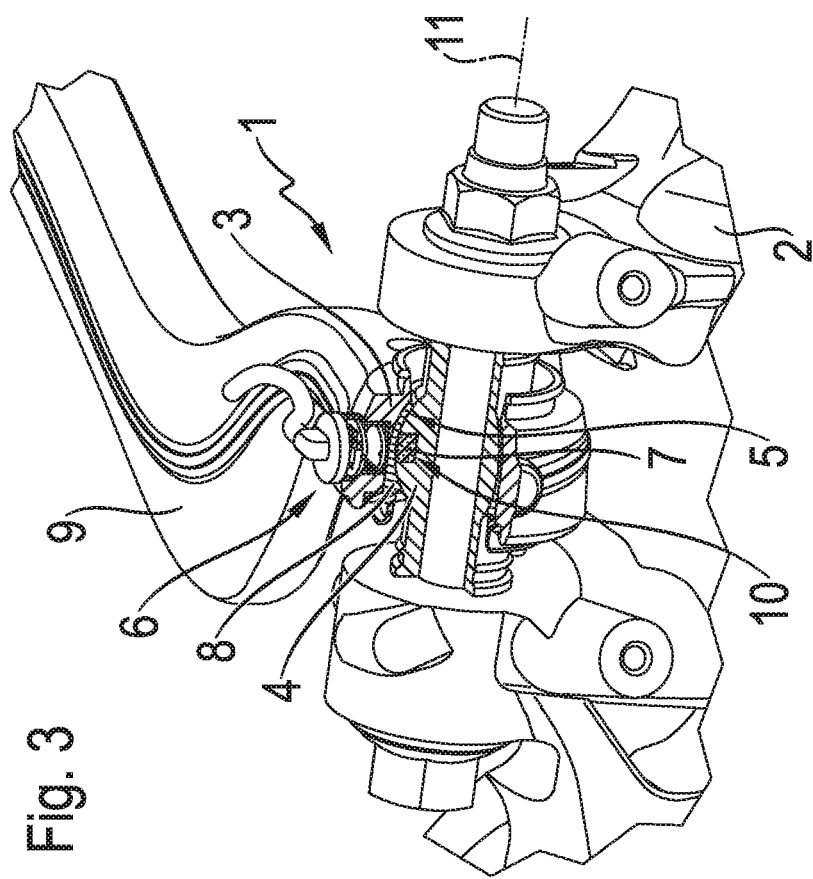

BALL JOINT

This application is a National Stage completion of PCT/EP2018/059802 filed Apr. 18, 2018, which claims priority from German patent application serial no. 10 2017 208 410.3 filed May 18, 2017.

FIELD OF THE INVENTION

The invention relates to a ball joint, in particular for a vehicle chassis, to the use of such a ball joint, and to a method for producing a joint body for such a ball joint.

BACKGROUND OF THE INVENTION

Ball joints for use in the chassis of motor vehicles have long been known in various forms from the prior art. Quite generally, these serve to connect a first component to a second component in an articulated manner; in chassis technology these are chassis elements, in particular such as control arm components, wheel carriers or the like, which for example are articulated to one another or to a vehicle body or an axle carrier.

To fulfill its basic function a ball joint typically comprises a joint housing and a joint body. The joint body, which depending on the design of the ball joint can be a ball stud or a ball sleeve, has a spherical section, that is to say, a partially ball-shaped surface area. Around its spherical section the joint body is held by the joint housing in order to be fitted into it in an articulated manner.

Present-day vehicles are increasingly equipped with measurement devices which, for example, determine a position of the wheel relative to the vehicle body in order to deduce the height level of the vehicle. From the design standpoint this can be done in that at least one ball joint built into the chassis comprises a sensor arrangement which enables the position of the joint body relative to the joint housing to be detected. This, then, is a ball joint with an integral position sensor.

DE 10 2004 039 781 A1 describes a ball joint which has the features specified in the preamble the independent claim (s). This is a ball joint in the form of an angle joint having a joint housing and a joint body in the form of a ball stud held in the housing so that it can rotate and pivot. A joint ball of the ball stud having a spherical section is supported relative to the joint housing by a bearing shell arranged between the ball stud and the joint housing. The ball stud can pivot relative to the joint housing about the mid-point of the joint ball and can rotate about the longitudinal axis of the ball stud.

The ball joint is equipped with a sensor arrangement that comprises a first sensor element associated with the joint housing and a second sensor element associated with the ball stud. The first sensor element is a magnetic field sensor arranged above the bottom of the housing, close to the axial, head-side end of the ball stud. The second sensor element associated with the ball stud is a permanent magnet arranged under a flattened area (pole surface) on the head side of the joint ball of the ball stud. The permanent magnet associated with the joint body (ball stud) co-operates with the magnetic field sensor associated with the joint housing in such manner that by means of the sensor arrangement so formed, the position of the ball stud relative to the joint housing can be detected. In particular, by means of the sensor arrangement the angular position of the ball stud relative to the joint housing can be determined. As shown by the single figure, in accordance with the measurement principle concerned this is a no-contact measurement.

In the ball joint previously known from DE 10 2004 039 781 A1, the joint body is supported relative to the joint housing exclusively in a peripheral area radial in relation to the longitudinal axis of the ball stud. Consequently, as regards the direction of the force transfer the ball joint shown has a limitation since the presence of the sensor arrangement restricts the supporting of the ball stud in the axial direction.

SUMMARY OF THE INVENTION

A purpose of the present invention is to indicate a ball joint of the type mentioned to begin with, which despite the presence of a sensor arrangement for detecting the position of the joint body, comprises a mechanical supporting portion which is approximately as large as that in a ball joint with no sensor arrangement. In addition, a method for producing a joint body for such a ball joint is indicated.

The objective mentioned above is, first, achieved by a ball joint having the characteristics specified in the independent claim(s). This is a ball joint designed particularly for a chassis of a vehicle, with a joint housing and a joint body having a spherical section. The spherical section of the joint body is held by the joint housing in order to be fitted into the latter in an articulated manner. Furthermore the ball joint has a sensor arrangement with a first sensor element associated with the joint housing and a second sensor element associated with the joint body, which co-operates with the first sensor element in order to detect the position of the joint body relative to the joint housing. According to the invention, in this case the second sensor element is arranged in the area of the spherical section of the joint body.

Since according to the invention the second sensor element associated with the joint body is arranged in the area of the spherical section of the joint body, compared with the ball joint of the prior art known from DE 10 2004 039 781 A1 the advantage is obtained that the mechanical supporting portion of the joint is not reduced, or only slightly so, by the presence of the sensor arrangement. In the ball joint known from the prior art the spherical section of the joint body is interrupted by a flattened pole area on the head side, i.e. at the axial end of the ball stud, under which the permanent magnet is arranged. Correspondingly, the supporting portion of the ball joint is reduced in the axial direction. To achieve the greatest possible, unrestricted mechanical supporting ability of the ball joint, according to the invention the idea was developed that the second sensor element which co-operates with the first sensor element should be arranged in the area of the spherical section of the joint body and thus in an area of mechanical load transfer. The position detection to be performed by the sensor arrangement, which takes place by co-operation between the first sensor element on the housing side and the second sensor element on the joint body side, therefore results in no disadvantageous impairment of the structure of the ball joint. The mechanical properties of the ball joint are thus similar to those of a ball joint without any sensor arrangement, despite the presence of a sensor arrangement.

It should be commented that the detection of the position of the joint body in the context of this invention is understood to mean mainly the angular position of the joint body relative to the joint housing. According to a further definition of terms, the term "position" could also be understood to mean the relative position of the joint body in relation to the joint housing which, for example due to the action of mechanical forces on the ball joint or due to wear (prolonged or repeated action of force), can change. In the context of this application the position detection relates mainly to the angle of the joint body relative to the joint housing.

In a possible embodiment of the ball joint the joint body is in contact with its spherical section against the joint housing. In that case the joint body and the joint housing are in direct contact. Since there are fewer components to be assembled, this represents a further development of the ball joint that can be produced simply.

Alternatively, in another advantageous further development of the invention a bearing shell is associated with the joint housing of the ball joint, which is in direct contact with the spherical section of the joint body. In this case the joint body is only in indirect contact with the joint housing, and the bearing shell arranged between them, which is for example made of plastic, prevents any direct contact between the joint housing and the joint body. This favors low-friction, low-wear fitting of the joint body relative to the joint housing.

According to a preferred design of the ball joint, the first and second sensor elements are so arranged relative to one another that a notional connection line between them intersects a contact area formed between the spherical section of the joint body and the joint housing, or between the spherical section of the joint body and a bearing shell associated with the joint housing. In other words, the first and second sensor elements are therefore so arranged relative to one another that the shortest line connecting them runs through the contact area between the joint body and the joint housing or the bearing shell. Depending on the measurement method used, preferably a magnetic field measurement, the measurement magnitude (for example magnetic field lines) passes through the contact area between the joint body and the joint housing or the bearing shell associated with the latter, so that the mechanical load-bearing capacity of the ball joint is not impaired thereby.

The invention can be used to good effect with ball joints of various forms. According to a preferred further development the ball joint is a so-termed ball sleeve joint, and in that case the joint body is in the form of a ball sleeve with a longitudinal axis.

Alternatively, the ball joint can be a radial joint, a supporting joint or an axial joint, wherein in these cases the joint body is respectively formed as a ball stud with a longitudinal axis. Whereas with a radial joint the forces between the joint body (ball stud) and the joint housing can be transferred mainly in the radial direction relative to the joint body, axial joints serve mainly for the transfer of forces in the axial direction relative to the longitudinal axis of the joint body (ball stud).

In a further advantageous further development of the invention the sensor arrangement of the ball joint serves to detect an angular position of the joint body relative to the joint housing. Depending on the application case, in particular on the position where the ball joint is fitted, it can be appropriate to detect only one, or more than one of the maximum of three rotational angles. According to a preferred further development of the invention, particularly when the ball joint is in the form of a ball sleeve joint, the sensor arrangement serves to detect the angular position of the joint body relative to the joint housing in relation to the longitudinal axis of the joint body (as a rotational axis of the joint). Thus, in this case the sensor arrangement detects in particular the pivoting angle of the joint body and the joint housing relative to the longitudinal axis of the joint body.

For the sensor arrangement of the ball joint various physical measurement principles can be used. In any case it is best to try to use a no-contact measurement principle. From the design standpoint the sensor arrangement is based on a magnetic measurement principle. According to this, for example one sensor element can be in the form of a permanent magnet (the signal emitter) whereas another sensor element is a magnetic field sensor (the signal receiver). If the position of the signal emitter changes relative to the signal receiver (because the ball joint has moved), the magnetic field sensor detects this in the form of a magnetic field change, by evaluating which position of the joint body relative to the joint housing can be inferred.

From the design standpoint, in the ball joint it is preferable for the second sensor element to be a signal emitter, in particular a permanent magnet, while the first sensor element is a signal receiver, in particular a magnetic field sensor. This allocation of functions has the advantage that a signal line required for the magnetic field sensor is comparatively simple to arrange or lay, since the first sensor element is associated with the joint housing. Alternatively, however, the converse is also possible.

From the standpoint of production technology, the sensor arrangement can advantageously be integrated in the ball joint, in that in the joint body, in the area of the spherical section a recess, particularly in the form of a bore or groove is made, which serves to accommodate the second sensor element. In such a case the second sensor element, specifically a permanent magnet, can for example be made essentially cylindrical so that it can be inserted into the bore and, for example, fitted tightly into the joint body. Alternatively the second sensor element can be annular or in the form of a ring segment which fits into an annular or ring-segment-shaped groove.

Advantageously, the recess is filled either by the second sensor element itself, or by the second sensor element and a supplementary cover in such manner that the spherical section of the joint body has an uninterruptedly ball-section-shaped external contour despite the fitting of the second sensor element. The recess can have several steps (for example it can be a stepped hole), wherein the second sensor element is held at the deepest level and the cover is supported on a higher level relative to the joint body.

Relative to the main loading direction of the ball joint the sensor arrangement can be in various positions. In order to influence the mechanical load-bearing part of the ball joint as little as possible, in an advantageous further development of the ball joint the second sensor element is arranged outside a main load-bearing area of the spherical section of the joint body.

The invention also relates to the use of a ball joint as described above to detect the angular position of the joint body relative to the joint housing, wherein the joint body is associated with a first chassis element and the joint housing with a second chassis element, so that the angular position detected corresponds to an angular position of the chassis elements relative to one another. In that way the ball joint described can be used expediently to detect the angular position between a wheel carrier and a (for example upper) transverse control arm articulated thereto by the ball joint. Among other things such angle detection can serve to determine the height level of a wheel carried by the wheel carrier relative to a vehicle body.

The objective stated at the beginning is also achieved by a method for producing a joint body for a ball joint as described above. According to the invention, the method comprises the following production steps:

production of a joint body, formation of a recess in the area of the spherical section of the joint body, insertion of a (second) sensor element into the recess, surface machining of the joint body to produce an uninterruptedly ball-section-shaped external contour of the spherical section.

With the method so described a joint body can be produced with comparatively little production-technological complexity, with which the advantages already described in connection with the ball joint according to the invention described can be obtained.

An advantageous further development of the method provides that after the second sensor element has been positioned a cover is also inserted into the recess, and in that case the surface machining is also carried out on the cover to produce an uninterruptedly ball-section-shaped external contour.

BRIEF DESCRIPTION OF THE DRAWINGS

Below, the invention will be described in greater detail with reference to a drawing. From this will also emerge further advantageous design features and effects of the invention. The drawings show:

FIG. 1: A ball joint according to a first example embodiment of the invention, shown in a perspective, partially sectioned view, FIG. 2: The ball joint of FIG. 1, in a non-sectioned view, FIG. 3: A ball joint according to a second example embodiment of the invention, shown in a perspective, partially sectioned view, FIG. 4: A ball joint according to a third example embodiment of the invention, shown in a perspective, partially sectioned view.

DETAILED DESCRIPTION OF THE PREFERRED EMBODIMENTS

Figure 5:
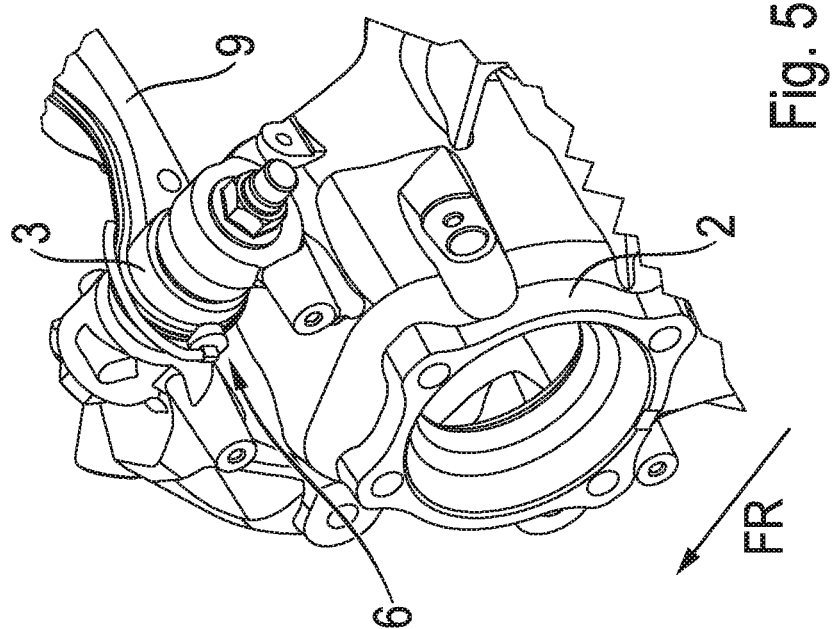
FIG. 5: A ball joint according to a fourth example embodiment.

FIGS. 1 and 2 show different views of a ball joint according to a first example embodiment of the invention, in a typical fitted condition. Here, the ball joint 1 is used in a vehicle chassis, in which it articulates a wheel carrier 2 (only partially shown) to a transverse control arm 9 (also only partially shown). The ball joint 1 is designed as a so-termed ball sleeve joint, with a ring-shaped joint housing 3 that encloses a sleeve-like joint body 4. The joint body 4, also called the ball sleeve, has a longitudinal axis 11 which runs essentially perpendicularly to the longitudinal extension of the transverse control arm 9. As can be seen in FIG. 1, in the example embodiment shown the control arm 9 has at its end facing toward the ball joint 1 an approximately S-shaped form. It is understood that instead of the transverse control arm 9 shown, control arms of different design or other structural components can be connected with the ball joint 1.

In the central area of the ball joint 1 the joint body 4 in the form of a ball sleeve has a partially ball-shaped thickened zone. This thickened zone forms a spherical section 5, which therefore forms a closed all-round surface area of the joint body 4. From the central area of the ball joint 1 formed by the spherical section 5, the joint body 4 in the form of a ball sleeve projects axially—relative to the longitudinal axis 11—in both directions in the manner of a sleeve. A screw-bolt 16 passes through mounting eyes 18, 19 formed a distance apart from one another on the wheel carrier 2 and thus also through the joint body 4 between them. The screw-bolt 16 is secured by a securing nut 17. The joint body 4 is connected to the wheel carrier 2 in this manner.

The joint housing 3 encloses the joint body 4 in the area of the spherical section 5 of the joint body 4. In the example embodiment shown, however, there is no direct contact between the spherical section 5 of the joint body 4 and the joint housing 3 because associated with the joint housing 3 there is a bearing shell 8 made of a plastic material, which in turn is directly in contact with the spherical section 5 of the joint body 4. Thus, the joint housing 3 and the joint body 4 are in indirect contact with one another via the—in this case—all-round bearing shell 8. On its inside surface the bearing shell 8 has a spherical shape, in itself conventional, which is therefore complementary to the shape of the spherical section 5 of the joint body 4 and thus mates with the latter, forming a contact area.

The ball joint 1 is equipped with a sensor arrangement by means of which an angular position of the joint body 4 relative to the joint housing 3 can be detected. As already explained with reference to its mechanical structure, the ball joint 1 forms an articulated connection between the transverse control arm 9 and the wheel carrier 2. In particular but not exclusively, the transverse control arm can pivot relative to the wheel carrier 2 about the longitudinal axis 11 of the ball joint 1. Besides, the spherical mounting described enables at least a certain amount of pivoting of the transverse control arm 9 about two respective co-ordinate axes perpendicular to the longitudinal axis 11, in each case with the mid-point of the ball as the center of rotation. However, a pivoting movement of the transverse control arm 9 about the longitudinal axis 11 is the main movement direction of the ball joint 1. The sensor arrangement serves in particular to detect the angular position of the transverse control arm 9 relative to the wheel carrier 2 in relation to rotation about the longitudinal axis 11 of the joint body 4.

The sensor arrangement comprises a first sensor element 6 associated with the joint body 4. This first sensor element 6 is a magnetic field sensor. A recess formed in the joint housing 3 partially accommodates the first sensor element 6. An inner area of the sensor element 6 has a cylindrical external contour and is accommodated completely by the joint housing 3. A further, outlying area of the first sensor element 6 projects radially outward from the joint housing 3, as can be seen in FIG. 2, which shows the ball joint 1 according to the first example embodiment in a non-sectioned view.

As can be seen from FIG. 1, the sensor arrangement also has a second sensor element 7 associated with the joint body 4 in the form of a ball sleeve, which element 7 is a permanent magnet. In the example embodiment shown in FIGS. 1 and 2 the second sensor element 7 is held in a recess 10 in the form of a bore formed in the joint body 4, in which it is inserted completely. Here, the second sensor element 7 in the form of a permanent magnet has a basic cylindrical shape. In the example embodiment shown the recess 10 formed in the joint body 4 has a number of steps (stepped bore) and is filled by the second sensor element 7 at the deepest level and by a supplementary cover 12 supported relative to the joint body 4 at a higher level of the recess 10. The second sensor element 7 and the cover 12 fill the recess 10 in such manner that the spherical section 5 of the joint body 4 has an uninterruptedly ball-section-shaped external contour despite the fitting of the second sensor element 7. Thus, the ball-section-shaped external contour of the joint body 4 in the area of the spherical section 5 is not interfered with by the fitting of the second sensor element 7.

In the sensor arrangement formed by the first and second sensor elements 6, 7 the second sensor element 7—the permanent magnet—is the signal emitter since the permanent magnet produces a magnetic field with a fixed location relative to the joint body 4. In turn, the first sensor element 6 serves as the signal receiver since it detects the magnetic field produced by the second sensor element 7 and transforms it into an electrical signal. If, due to a movement of the joint body 4 and the joint housing 3 relative to one another, the magnetic field detected by the first sensor element 6 changes because of a change in the relative position of the first sensor element 6 (the magnetic field sensor) relative to the second sensor element 7 (the permanent magnet), the first sensor element 6 produces a measurement signal from which the angular position of the joint body 4 relative to the joint housing 3 can be inferred. In this way, in the ball joint 1 the first sensor element 6 and the second sensor element 7 co-operate so that the position of the joint body 4 relative to the joint housing 3 can be detected.

Since the second sensor element 7 is arranged in the area of the spherical section 5 of the joint body 4, the ball joint 1 can have a shape conventional in itself. In the example embodiment shown, the first and second sensor elements 6, 7 are arranged relative to one another in such manner that a notional line connecting them intersects a contact area formed between the spherical section 5 of the joint body 4 and a bearing shell 8 associated with the joint housing 3. In other words, in this design the magnetic field measurement takes place through the bearing shell 8, i.e. through an area of the ball joint 1 that can be mechanically loaded. In the example embodiment shown, the second sensor element 7 is covered externally by the cover 12 relative to the bearing shell 8. Since the cover 12 is supported at the higher level of the recess 10, the spherical section 5 of the joint body 4 can take mechanical loads even in the area of the second sensor element 7.

In the ball joint 1 according to the first example embodiment, both the second sensor element 7 and the first sensor element 6 are arranged laterally relative to a main extension plane of the transverse control arm 9. Thus, the arrangement lies outside a main load-bearing area of the ball joint 1, since the main loading direction of the ball joint 1 shown is in the main extension direction of the transverse control arm 9.

FIG. 3 shows a second example embodiment of a ball joint 1, which is essentially the same as the first example embodiment. To that extent, reference can first be made to the explanations relating to it. The difference is that in the ball joint 1 according to the second example embodiment the second sensor element 7 (the permanent magnet) is made such that it, itself, fills the recess 10. In other words, no closure cover is needed. In this case the second sensor element 7 can be made as a simple cylindrical body.

In the embodiment shown in FIG. 3, a bore is provided in the joint housing 3 for accommodating the first sensor element 6. In the case illustrated this is not through-going. Alternatively a through-going bore can be provided.

FIG. 4 shows a third example embodiment of a ball joint 1, which again is essentially similar to the ball joint according to the second example embodiment. Thus, for explanations reference should first be made to the corresponding previous description. The difference is that in the ball joint 1 according to the third example embodiment the second sensor element (the permanent magnet) has a fundamentally different structure. In this third example embodiment the second sensor element 7, which acts as the signal emitter, is of annular shape, wherein a closed ring or an interrupted ring are conceivable. On the joint body 4, in the area of the spherical section 5 an annular groove or a plurality of ring-segment-like recesses is/are arranged. In the example embodiment illustrated in FIG. 4 an annular second sensor element 7 in the form of a permanent magnet is held therein.

Figure 6:
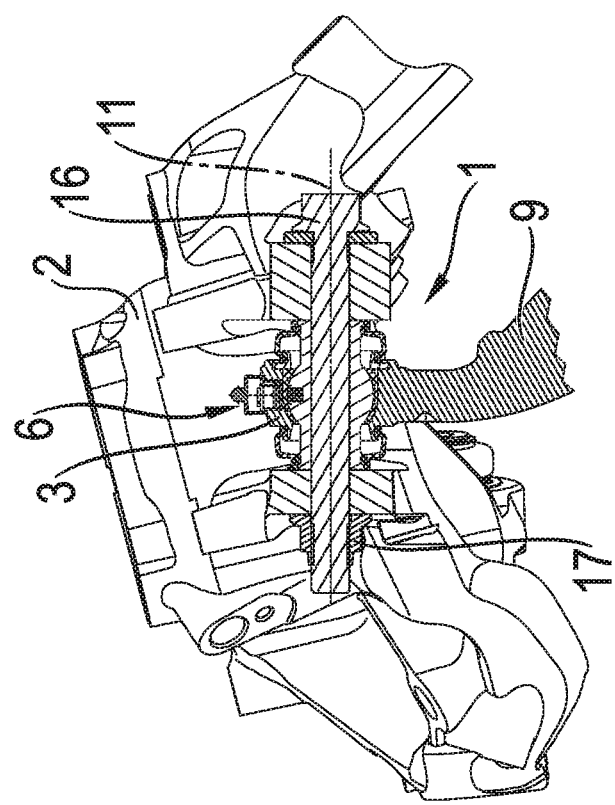
FIG. 6: The ball joint of FIG. 5, viewed in section from above.
Figure 7:
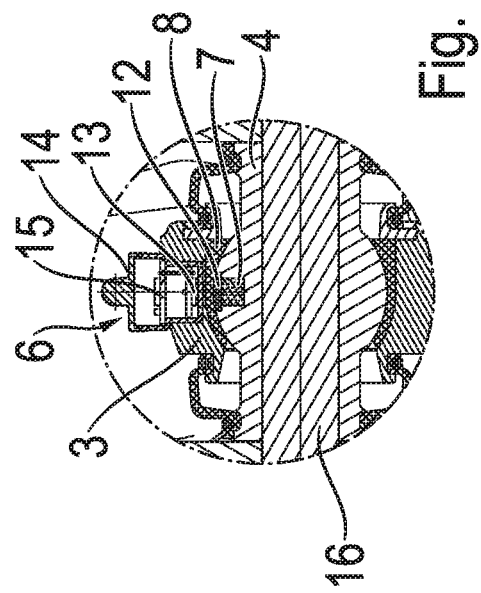
FIG. 7: The detail A from FIG. 6, FIG. 8: A ball joint according to a fifth example embodiment of the invention, shown in a perspective, partially sectioned view.

FIGS. 5, 6 and 7 show a ball joint 1 according to a fourth example embodiment. FIG. 5 shows a perspective view of the ball joint, FIG. 6 a sectioned representation seen from above and FIG. 7 an enlarged section of the detail A.

As regards its structure the ball joint 1 according to the fourth example embodiment is essentially similar to the ball joints of the first to third example embodiments, and reference should be made to the corresponding descriptions. As a supplement, by indicating the travel direction FR FIG. 5 shows the orientation in relation to the fitting situation on the wheel carrier of a vehicle. Otherwise than in the ball joints of example embodiments one to three, in the ball joint 1 according to the fourth example embodiment (FIGS. 5 to 7) the sensor arrangement comprising the first sensor element 6 and the second sensor element 7 is arranged on a side of the ball joint 1 facing away from the transverse control arm 9. In FIG. 5 this can be seen simply from the indexing of the first sensor element 6, which is arranged on the side facing away from the control arm 9. This kind of arrangement has the advantage that a measurement detected with the sensor arrangement concerning the angular position is not, or hardly at all influenced, in particular falsified, by forces acting from the transverse control arm 9 upon the ball joint 1. The reason for this is that forces transmitted via the transverse control arm 9 cannot influence the direction of the magnetic field produced by the second sensor element 7 relative to the first sensor element 6, or hardly at all so.

As can be seen from FIG. 7, the ball joint 1 according to the fourth example embodiment has in other respects a structure that is similar to that of the first example embodiment. Thus, the second sensor element 7 is also covered by a cover 12. FIG. 7 also shows more clearly the design of the first sensor element 6. Essentially, this comprises a sensor housing 14 which accommodates a sensor 13 and a circuit board 15. An area of the first sensor element 6 that accommodates the sensor 13 is located inside the joint housing 3. Another area that accommodates the circuit board 15 projects radially out from the joint housing 3.

Figure 9:
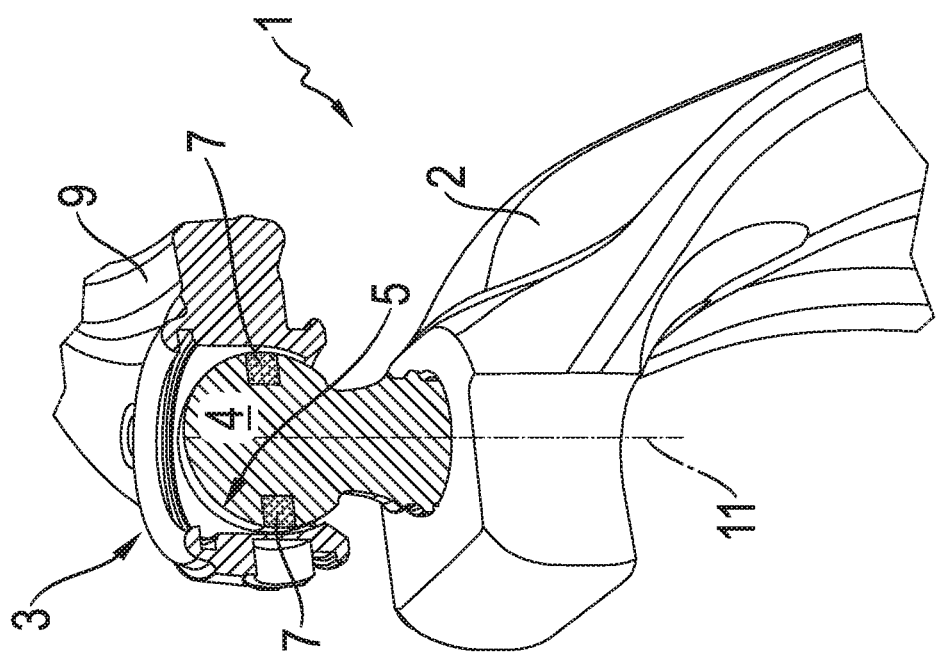
FIG. 9: A ball joint according to a sixth example embodiment of the invention, shown in a perspective, partially sectioned view.
Figure 8:
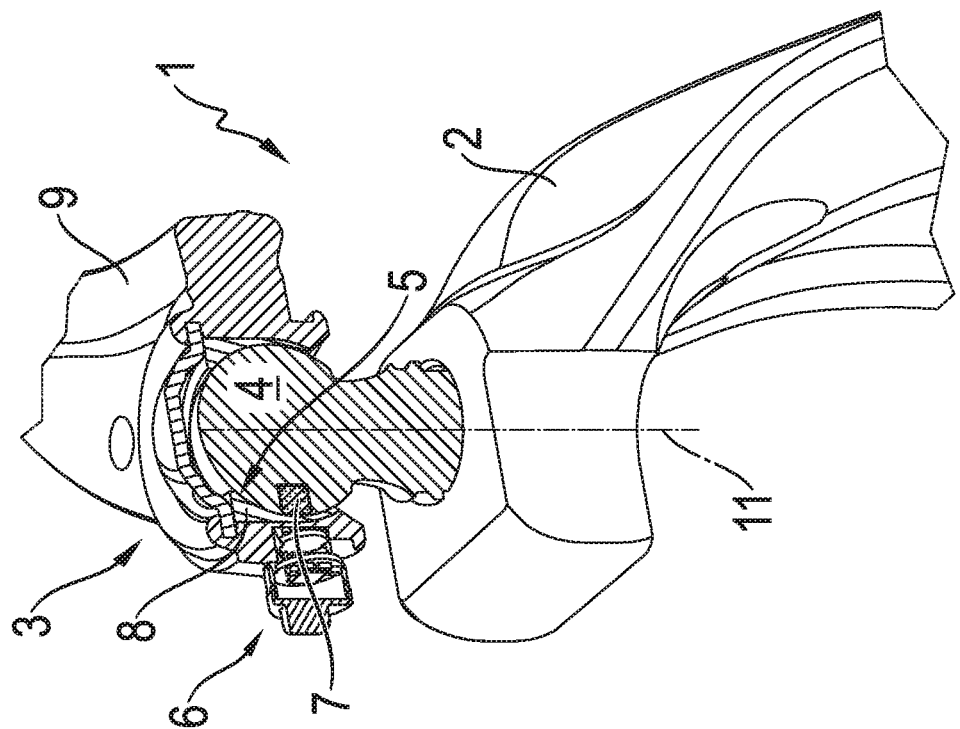

The above-described ball joints according to example embodiments one to four have in each case the structural form of a so-termed ball sleeve joint. While achieving similar advantageous effects the invention can also be used with ball joints in the form of a radial joint, a supporting joint or an axial joint. FIGS. 8 and 9 show, respectively, examples of a ball joint 1 according to a fifth and sixth example embodiment of the invention in the form of a radial joint. The ball joint 1 in the form of a radial joint again comprises a joint housing 3 and a joint body 4 provided with a spherical section 5. In this case—otherwise than in a ball sleeve joint—the joint body 4 is in the form of a so-termed ball stud. The joint body 4 in the form of a ball stud is accommodated around its spherical section 5 by the joint housing 3 in order to be able to move relative thereto in an articulated manner.

In the fifth example embodiment shown in FIG. 8 the ball joint 1 shown has a sensor arrangement comprising a first sensor element 6 associated with the joint housing 3 and a second sensor element 7 associated with the joint body 4. The second sensor element 7 is again a permanent magnet which, being an approximately cylindrical component, is inserted into a bore in the spherical section 5 of the joint body 4.

The ball joint 1 shown in FIG. 9 according to the sixth example embodiment of the invention is essentially similar to the ball joint according to the fifth example embodiment, so reference should be made to the corresponding description. The difference in the ball joint 1 according to the sixth example embodiment is that the second sensor element 7 in the form of a permanent magnet is annular.

In the ball joints of the fifth and sixth example embodiments shown in FIGS. 8 and 9, the ball joint 1 is again used to form the articulated connection between a wheel carrier 2 and a transverse control arm 9. The sensor arrangement associated in each case with the ball joint 1 makes it possible to detect the position of the joint body 4 in the form of a ball stud relative to the joint housing 3.

INDEXES

1 Ball joint
2 Wheel carrier
3 Joint housing
4 Joint body
5 Spherical section
6 Magnetic field sensor
7 Permanent magnet
8 Bearing shell
9 Transverse control arm
10 Recess
11 Longitudinal axis of the joint body
12 Cover
13 Sensor
14 Sensor housing
15 Printed circuit board
16 Screw-bolt
17 Securing nut
18 Mounting eye
19 Mounting eye
20 Mid-point of the joint
FR Travel direction

The invention claimed is:

1. A ball joint for a vehicle chassis, the ball joint having a joint housing and a joint body with a spherical section,
the joint body being held around its spherical section by the joint housing so that the joint body is movable relative to the joint housing in an articulated manner,
a sensor arrangement comprising a first sensor element which is associated with the joint housing and a second sensor element which is associated with the joint body, the second sensor element co-operating with the first sensor element to detect a position of the joint body relative to the joint housing, and the second sensor element being arranged in an area of the spherical section of the joint body,
the spherical section of the joint body having a recess that is filled either with the second sensor element or with the second sensor element and a cover, the second sensor element or the cover having an outer surface with a contour that matches an outer surface of the spherical section of the joint body such that the spherical section of the joint body has an uninterruptedly spherical-section-shaped external contour despite a presence of the second sensor element, and
the second sensor element is arranged outside a main load-bearing area of the spherical section of the joint body.

2. The ball joint according to claim 1, wherein the spherical section of the joint body is in contact with the joint housing.

3. The ball joint according to claim 1, wherein a bearing shell is associated with the joint housing, which is in direct contact with the spherical section of the joint body.

4. The ball joint according to claim 1, wherein the first and the second sensor elements are arranged relative to one another in such a manner that a contact area formed between the spherical section of the joint body and the joint housing, or between the spherical section of the joint body and a bearing shell associated with the joint housing is located between the first and the second sensor elements.

5. The ball joint according to claim 1, wherein the ball joint is a ball sleeve joint, and the joint body is in a form of a ball sleeve with a longitudinal axis.

6. The ball joint according to claim 1, wherein the ball joint is one of a radial joint, a supporting joint and an axial joint, and the joint body is in a form of a ball stud with a longitudinal axis.

7. The ball joint according to claim 1, wherein the sensor arrangement detects an angular position of the joint body relative to the joint housing, and the angular position relates to a longitudinal axis of the joint body.

8. The ball joint according to claim 1, wherein the sensor arrangement is based on a magnetic measurement principle.

9. The ball joint according to claim 1, wherein the first sensor element is a magnetic field sensor and the second sensor element is a permanent magnet.

10. The ball joint according to claim 1, wherein the joint body has a recess, in an area of the spherical section, in a form of either a bore or a groove, and the recess accommodates the second sensor element.

11. The ball joint according to claim 1, wherein the recess is filled by the second sensor element and the outer surface of the second sensor element has a contour that matches a contour of the spherical section such that the spherical section of the joint body has the uninterruptedly spherical-section-shaped external contour.

12. Use of a ball joint according to claim 1, for detecting the angular position of the joint body relative to the joint housing, wherein the joint body is associated with a first chassis element and the joint housing is associated with a second chassis element, whereby the detected angular position corresponds with an angular position of the first and the second chassis elements relative to one another.

13. A ball joint for a vehicle chassis, the ball joint having a joint housing and a joint body with a spherical section,
the joint body being held around its spherical section by the joint housing so that the joint body is movable relative to the joint housing in an articulated manner,
a sensor arrangement comprising a first sensor element which is associated with the joint housing and a second sensor element which is associated with the joint body, the second sensor element co-operating with the first sensor element to detect a position of the joint body relative to the joint housing, and the second sensor element being arranged in an area of the spherical section of the joint body, the spherical section of the joint body having a recess that is filled either with the second sensor element or with the second sensor element and a cover, the second sensor element or the cover having an outer surface with a contour that matches an outer surface of the spherical section of the joint body such that the spherical section of the joint body has an uninterruptedly spherical-section-shaped external contour despite a presence of the second sensor element, and the recess is filled by the second sensor element and the cover, the recess has a number of steps such that the second sensor element is held at a deepest level of the recess and the cover is supported at a higher level of the recess relative to the joint body.

14. A method of producing a joint body for a ball joint for a vehicle chassis, the ball joint having a joint housing and a joint body with a spherical section, the joint body being held around its spherical section by the joint housing so that the joint body is movable relative to the joint housing in an articulated manner, and a sensor arrangement comprising a first sensor element which is associated with the joint housing and a second sensor element which is associated with the joint body, the second sensor element co-operates with the first sensor element to detect a position of the joint body relative to the joint housing, and the second sensor element is arranged in an area of the spherical section of the joint body, the method comprising:

preparing the joint body, producing a recess in an area of the spherical section of the joint body, inserting the second sensor element into the recess, after inserting the second sensor element, additionally inserting a cover into the recess, and surface machining the joint body and the cover such that the spherical section has an uninterrupted spherical-section-shaped external contour and an external contour of the cover matches the external contour of the spherical section of the joint body.

* * * * *